Nov. 12, 1968    R. N. HALL    3,410,132
SEMICONDUCTOR STRAIN GAUGE
Filed Nov. 1, 1966
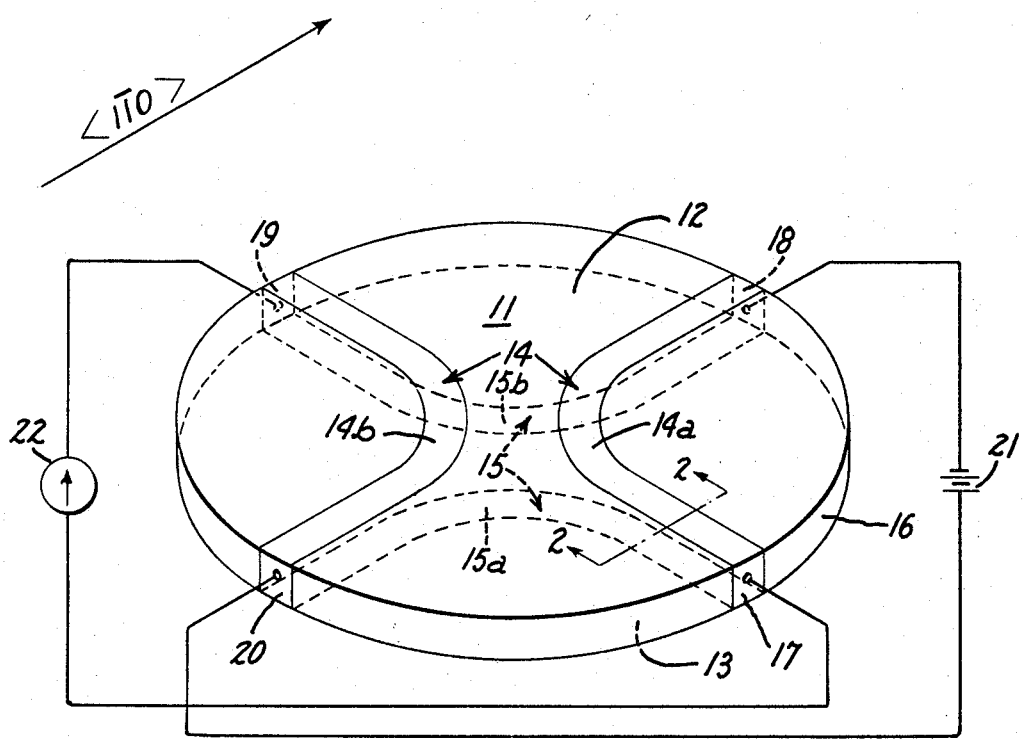
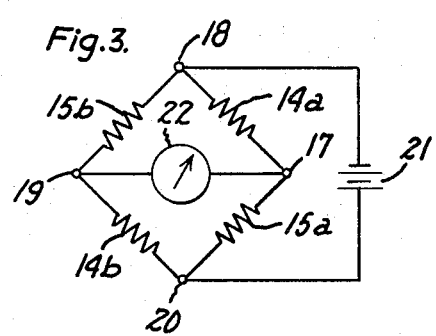
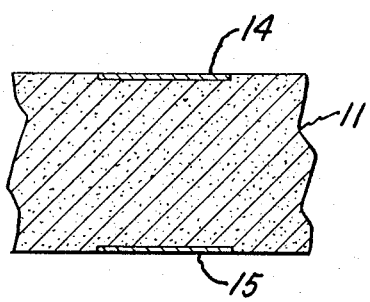
Inventor:
Robert N. Hall,
by Marvin Snyder
His Attorney.

United States Patent Office 3,410,132
Patented Nov. 12, 1968

3,410,132
SEMICONDUCTOR STRAIN GAUGE
Robert N. Hall, Schenectady, N.Y., assignor to General Electric Company, a corporation of New York
Filed Nov. 1, 1966, Ser. No. 591,306
11 Claims. (Cl. 73—88.5)

ABSTRACT OF THE DISCLOSURE

A strain sensitive element is typically comprised of a monocrystalline semiconductive wafer having a first pair of radially directed low resistivity zones formed in its upper surface and a second pair of radially directed low resistivity zones formed in its lower surface. In each surface, the high resistivity of the semiconductive material electrically insulates the low resistivity zones from each other. The extremities of the first pair of zones are connected to respective proximate extremities of the second pair of zones by conductive means along the wafer periphery, and may be further interconnected to form a bridge circuit.

---

This invention relates to semiconductor strain sensitive devices, and more particularly to a monolithic bridge-type strain gauge.

Many problems are presented in suitably applying strain sensitive elements to strained members for measuring loads. Cements may creep and mechanical linkages may slip or exhibit mechanical hysteresis. Further, in a complete bridge-type semiconductor strain sensitive element, such as shown and described in G. E. Fenner Patent No. 3,251,222, issued May 17, 1966, and assigned to the instant assignee, the bridge arms should preferably be very thin and the semiconductive material thereof heavily impregnated with impurity, in order to obtain the desired electrical impedance and achieve maximum strain sensitivity. This requires care in fabrication of the device so as to obtain a high impedance, complete bridge unit capable of measuring a wide range of strains.

R. N. Hall application Ser. No. 161,964, filed Dec. 26, 1961, now Patent No. 3,292,128, issued Dec. 13, 1966 and assigned to the instant assignee, discloses a strain gauge fabricated of a high resistivity monocrystalline silicon disk having four zones, two on each disk face, into which a large concentration of impurities is diffused. These zones are formed in parallel, dumbbell-shaped strips on each face, oriented orthogonally to the strips on the opposite face. The strips are connected together at their ends to form an electrical bridge circuit analogous to the "picture frame" structure shown and described in the aforementioned Fenner Patent No. 3,251,222, wherein parallel strips comprise opposite bridge arms. Consequently, the piezoresistive bridge arms so formed are imbedded within the strained member itself, obviating any need for a cement. Moreover, since the two arms on one side of the bridge are loaded in tension while the other two are loaded in compression, there exists great freedom to select an orientation which will maximize sensitivity and provide a wide linear range of response.

In making the strain gauge of the aforementioned Hall application, four small holes are provided through the disk and the ends of the dumbbell-shaped piezoresistive strips formed on the disk, so as to facilitate diffusion of an impurity into the holes and thereby electrically connect the strips. While the device formed in this manner is satisfactory for operation as a hydrostatic pressure gauge, fabrication of the device would be greatly simplified if this formation of holes through the disk in order to electrically connect the strips were unnecessary. The present invention obviates all need for having holes through the wafer by utilizing a configuration which permits connection of the low resistivity strips on either side of the disk through conducting means disposed on the periphery of the disk. Moreover, by forming each of the four piezoresistive zones in the shape of two radially-directed strips connected close to the geometric center of the respective disk face, an increase in sensitivity is achieved. This is because strain due to hydrostatic pressure becomes increasingly greater as the geometric center is approached. Hence, the present invention is an improvement over the invention of the aforementioned Hall application Ser. No. 161,964.

Accordingly, one object of the invention is to provide a highly sensitive monolithic semiconductor strain gauge.

Another object is to provide a hydrostatic pressure gauge of simple configuration, which requires a minimum number of manufacturing operations in fabrication of the gauge.

Another object is to provide a strain sensitive device having piezoresistive elements formed on two faces thereof and electrically connected only at peripheral locations.

Briefly, in accordance with a preferred embodiment of the invention, a semiconductor strain sensitive device is provided comprising a monocrystalline body of high resistivity material having upper and lower faces. A first pair of low resistivity zones is formed in the surface region of the upper face of the body, each zone in the upper face being electrically insulated from the other and generally radiating outward along two separate directions from a central region in the upper face to the periphery thereof. A second pair of low resistivity zones is formed in the surface region of the lower face of the body, each zone in the lower face being electrically insulated from the other and generally radiating outward along two separate directions from a central region in the lower face to the periphery thereof. Conductive means are disposed along the periphery of the body for connecting each extremity of the zones in the upper face to the closest extremity of each zone in the lower face, respectively.

As used herein, the term "longitudinal" with respect to the elastoresistance coefficient refers to the change in resistivity when current and strain are measured parallel to each other. Similarly, the term "transverse" with respect to the elastoresistance coefficient refers to the change in resistivity when current and strain are measured perpendicular to each other.

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

FIGURE 1 is an isometric view of a semiconductive strainsensitive device constructed in accordance with the invention and connected in a circuit;

FIGURE 2 is a sectional view taken through the section designated 2—2 in the monocrystalline body of FIGURE 1; and FIGURE 3 is a schematic diagram of the strain gauge of FIGURE 1 when utilized in a circuit.

In FIGURE 1, the strain gauge of the instant invention is illustrated as comprising a monocrystalline body 11 of high resistivity, wide band-gap semiconductive material capable of achieving a wide range of resistivity at room temperature, such as silicon, gallium arsenide, or aluminum antimonide. The semiconductive material of body 11 should be capable of achieving a sufficiently high resistivity at room temperature so that the ratio of resistivity of the high resistivity material to that of the low resistivity zones established therein is at least 10⁴ and preferably greater than 10⁶. Thus, the band-gap of the semiconductive material must be sufficiently wide so that the concentration of intrinsic charge carriers is below a level which would prevent achieving the required high resistivity at room temperature in body 11 and yet not be so wide as to prevent high impurity low impedance zones to be established therein.

Body 11 may be in the form of an annular disk or wafer, having two large-area plane parallel faces 12 and 13 respectively. A first pair of low resistivity zones 14a and 14b, generally designated 14, are formed in the surface region of upper face 12, and a second pair of low resistivity zones 15a and 15b, generally designated 15, are formed in the surface region of lower face 13. Zones 14 and 15 are very thin in relation to wafer 11, as shown in FIGURE 2, being preferably in the order of 10–100 microns in thickness. Resistivity of zones 14 and 15 is less than about 10 ohm centimeters and preferably in the order of 0.1 to 0.001 ohm centimeter at room temperature. In each face, the pairs of low resistivity zones are electrically insulated from each other, and radiate outward along crystallographic axes as described in greater detail, infra, from a region situated generally at the geometric center of the respective face, to conductive regions situated on the periphery 16 of disk 11. For maximum sensitivity in measuring strain due to hydrostatic pressure, the low resistivity zones in each face should radiate along the aforementioned predetermined axes from as close to the geometrical center as possible, without producing a low resistivity path through either face of wafer 11 between the two zones of that face. Thus, for maximum sensitivity, the geometrical configuration of the zones is such that as much as possible of each zone is directed along each of a pair of radial paths. The configuration of the low resistivity zones shown in FIGURE 1 might be designated right angles slightly distorted so that the sides of each angle are joined only through a low resistivity path which avoids passage through the exact geometrical center of the face. Electrical contact between low resistivity zones in either face is thus avoided.

Means are provided for making substantially non-rectifying electrical connections to peripheral conducting regions 17, 18, 19 and 20 which join each extremity of each zone in the upper face to the closest extremity of each zone in the lower face, respectively. Conductive regions 18 and 20 are energized from a DC source 21, and the output signal is measured across regions 17 and 19 by indicating means 22. In this fashion, the low resistivity zones of wafer 11 are connected as the arms of a bridge circuit, with opposite resistance arms of the bridge being disposed on opposite faces of wafer 11.

For a strain resulting from a given stress applied perpendicularly to the faces of disk 11, resistance of the two low resistivity zones on one face should increase while resistance of the two low resistivity zones on the opposite face decreases. This enables application of maximum potential difference across indicating means 22 for any strain resulting from the perpendicularly applied stress. When the device is used as a pressure diaphragm for measuring hydrostatic pressure, for example, the low resistivity zones on one face are loaded in tension and the low resistivity zones on the opposite face are loaded in compression. In this device, under these conditions, the predominate strain is such that the change in resistance is determined principally by the longitudinal elastoresistance coefficient of the radially-directed portions of the low resistivity zones and by both the longitudinal and transverse elastoresistance coefficients of the remaining portion of each low resistivity zone. The change in resistance of the radially-directed portions is also determined, to some extent, by the transverse elastoresistance coefficient thereof. The crystallographic orientation of wafer 11, therefore, and the conductivity type of the respective low resistivity zones, are selected to assure that both the longitudinal and transverse elastoresistance coefficients of the low resistivity zones are large and of the same polarity, so as to maximize sensitivity. A detailed description of these coefficients and their significance may be obtained, inter alia, from Pfann, et al., Semiconducting Stress Transducers Utilizing The Transverse and Shear Piezoresistance Effects, 32, Journal of Applied Physics 2008 (October 1961).

For example, in FIGURE 1, the high resistivity wafer 11 is assumed to comprise silicon having low resistivity zones whose radial segments are directed along the $<110>$ and $<1\bar{1}0>$ crystallographic axes. Since N-type conductivity silicon oriented along these axes exhibits large longitudinal and transverse elastoresistance coefficients of identical polarity, the two pairs of zones 14 and 15 may be suitably impregnated with an impurity material to render them N-type with a room temperature resistivity of below 10 ohm centimeters. Low resistivity zones 14 and 15 will then exhibit the desired large longitudinal elastoresistance coefficient of one polarity and large transverse elastoresistance coefficient of identical polarity.

The balance of the bridge circuit, which is illustrated schematically in FIGURE 3, the ratio of resistance of the two low resistivity zones 14a and 15a defining one current path should equal the ratio of resistances of the two low resistivity zones 14b and 15b defining the other current path. Thus, the following relationship should be satisfied:

$$R_{14a}/R_{15a} = R_{15b}/R_{14b}$$

where the terms $R_{14a}$, $R_{14b}$, $R_{15a}$ and $R_{15b}$ refer respectively to the resistance values of the four low resistivity zones 14a, 14b, 15a and 15b. This equality may be conveniently satisfied by making all four portions of zones 14 and 15 of substantially equal dimensions and resistivity.

From the above relationship, it is apparent that the greatest unbalance of the bridge is achieved when the resistance change in low resistivity zones 14 is large and opposite to the resistance change in low resistivity zones 15. Thus, a maximum indication on detector 22 for a given stress results when zones 14 show a large increase in resistance while zones 15 shows a large decrease in resistance, or vice-versa. This condition is fully satisfied in the silicon strain sensitive device shown in FIGURE 1 when, for example, conductivity of zones 14 and 15 is rendered N-type, and wafer 11 is oriented so that the radially-directed segments of zones 14 and 15 extend along the $<110>$ and $<1\bar{1}0>$ crystallographic axes directions. Alternatively, zones 14 and 15 may be formed along the $<100>$ and $<010>$ axes. In the event conductivity of the zones were rendered P-type, or either N or P-type in the case of a germanium wafer, the radially-directed segments would be formed along the $<1\bar{1}0>$ and $<11\bar{2}>$ crystallographic axes.

Each portion of zones 14a, 14b, 15a and 15b, assuming the zones comprise silicon of N-type conductivity, is disposed parallel over almost an entire one-half of its length to the $<110>$ crystallographic axis, and over almost the entire other half of its length is disposed parallel to the $<1\bar{1}0>$ crystallographic axis. When used as a hydrostatic pressure measuring device, the change in resistance is determined by both the longitudinal and transverse elastoresistance coefficients for both pairs of low resistivity zones 14 and 15, with the desired opposite polarity of this lens change being provided by the compression and tension loading of the respective zones. The resulting unbalance of the bridge circuit may be detected by detecting means 22 in a well-known manner.

The strain gauge of the instant invention may be fabricated by providing a high purity, wide band-gap monocrystalline semiconductor body or wafer, such as silicon, gallium arsenide, or the like, wherein size and thickness of the wafer are determined by the magnitude of the load to be measured by the device, and the sensitivity desired. The wafer is converted to high resistivity in excess of about 10,000 ohm centimeters by indiffusing a deep-level impurity such as gold in the case of silicon, or germanium, or iron or chromium in the case of gallium arsenide. Zones 14 and 15 are then converted to low resistivity of less than about 10 ohm centimeters by, for example, mask-diffusing a conductivity determining impurity therein.

FIGURE 2 illustrates the resulting low resistivity zones in section, as viewed along line 2—2 of FIGURE 1. These zones are formed for a preselected orientation of the crystal so as to exhibit longitudinal and transverse elastoresistance coefficients which are large and of the same polarity. In a silicon body, these conditions are satisfied by indiffusing a donor impurity, such as phosphorus, into zones 14 and 15, with the radially-directed segments thereof extending along the $<110>$ and $<1\bar{1}0>$ crystallographic axes. If it be desired to render these zones of P-type conductivity, a suitable acceptor impurity, such as boron may be diffused into these zones of the silicon wafer, with the radially-directed segments thereof extending along the $<1\bar{1}0>$ and $<11\bar{2}>$ crystallographic axes.

A metal, such as aluminum, is next evaporated over ends 17–20 of the low resistivity zones of the periphery 16 of the wafer, as shown in FIGURE 1, and leads are connected thereto preferably by thermocompression bonding. The bridge unit so formed may be balanced by removing some of the low resistivity material from one or more of the appropriate zones 14a, 14b, 15a and 15b of the wafer. This may be accomplished by etching or the like.

The foregoing describes a highly sensitive monolithic semiconductor strain gauge for measuring hydrostatic pressure. The gauge is of simple configuration, requiring but a minimum number of manufacturing operations in fabrication thereof. The device is formed in the shape of a wafer having two major faces, with piezoresistive elements formed in the surface region of each face and electrically connected to each other only at peripheral locations.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What is claimed is:

1. A semiconductor strain sensitive device comprising a monocrystalline body of high resistivity semiconductor material having upper and lower faces; a first pair of low resistivity zones in the surface region of said upper face of said body, each of said zones in said upper face being electrically insulated from the other and generally directed radially outward from a central region in said upper face along two separate directions to the periphery of said body; a second pair of low resistivity zones in the surface region of said lower face of said body, each of said zones in said lower face being electrically insulated from the other and generally directed radially outward from a central region in said lower face along two separate directions to the periphery of said body; and conductive means along the periphery of said body connecting the extremities of said first pair of zones to respective proximate extremities of said second pair of zones.

2. The semiconductor strain sensitive device of claim 1 wherein said semiconductor material comprises silicon, each of said low resistivity zones in said upper and lower faces of said body is of N-type conductivity, and said separate directions are along the $<1\bar{1}0>$ and $<110>$ crystallographic axes.

3. The semiconductor strain sensitive device of claim 1 wherein said semiconductor material comprises one of the groups consisting of silicon and germanium, each of said low resistivity zones in said upper and lower faces of said body is of P-type conductivity, and said separate directions are along the $<1\bar{1}0>$ and $<11\bar{2}>$ crystallographic axes.

4. The semiconductor strain sensitive device of claim 1 wherein said semiconductor material comprises germanium, each of said low resistivity zones in said upper and lower faces of said body is of N-type conductivity, and said separate directions are along the $<1\bar{1}0>$ and $<11\bar{2}>$ crystallographic axes.

5. The semiconductor strain sensitive device of claim 1 including first circuit means coupled to one extremity of each zone in the surface region of said upper face and one extremity of each zone in the surface region of said lower face for applying an external signal to each of said zones; and second circuit means connected to the remaining extremities of said zones for providing an output signal in accordance with pressure on said body.

6. The semiconductor strain sensitive device of claim 1 wherein each of said zones in said upper face is generally directed radially outward from said central region in said upper face along two substantially orthogonal directions and each of said zones in said lower face is generally directed radially outward from said central region in said lower face along two substantially orthogonal directions.

7. The semiconductor strain sensitive device of claim 6 wherein each radially directed portion of each zone in said upper face is substantially superimposed above a radially directed portion respectively of a zone in said lower face.

8. The semiconductor strain sensitive device of claim 7 wherein the radially directed portions of each zone in said upper face are substantially superimposed above one radially directed portion of one zone in said lower face and one radially directed portion of the other zone in said lower face.

9. The semiconductor strain sensitive device of claim 8 including first circuit means coupled to one extremity of each zone in the surface region of said upper face and one extremity of each zone in the surface region of said lower face for applying an external signal to each of said zones; and second circuit means connected to the remaining extremities of said zones for providing an output signal in accordance with pressure on said body.

10. The semiconductor strain sensitive device of claim 1 wherein one radially-directed portion of each zone in said upper face is directed along a crystallographic axis of said body in common with one portion of one of said zones in said lower face, and the other radially directed portion of said each zone in said upper face is directed along a crystallographic axis of said body in common with one portion of the other of said zones in said lower face.

11. The semiconductor strain sensitive device of claim 10 including first circuit means coupled to one extremity of each zone in the surface region of said upper face and one extremity of each zone in the surface region of said lower face for applying an external signal to each of said zones; and second circuit means connected to the remaining extremities of said zones for providing an output signal in accordance with pressure on said body.

References Cited

UNITED STATES PATENTS

| | | | |
|---|---|---|---|
| 3,049,685 | 8/1962 | Wright | 73—88.5 XR |
| 3,277,698 | 10/1966 | Mason | 73—88.5 |
| 3,292,128 | 12/1966 | Hall | 73—88.5 XR |
| 3,329,023 | 7/1967 | Kurtz et al. | 73—398 |

RICHARD C. QUEISSER, *Primary Examiner.*

C. A. RUEHL, *Assistant Examiner.*